J. CARLSON AND P. PASCUCCI.
MACHINE FOR MAKING MACARONI.
APPLICATION FILED MAY 13, 1919.
1,331,183.
Patented Feb. 17, 1920.
3 SHEETS—SHEET 1.
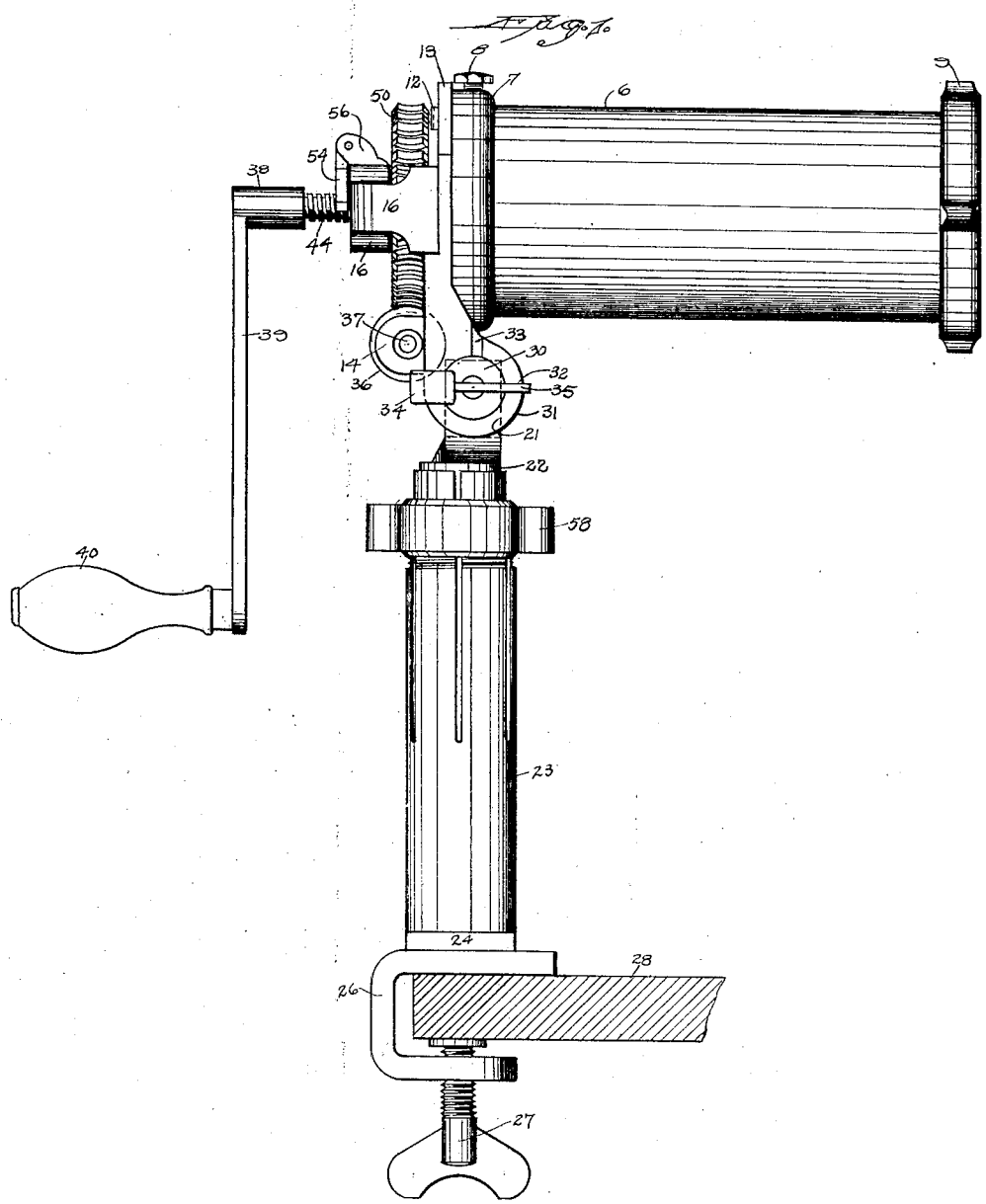

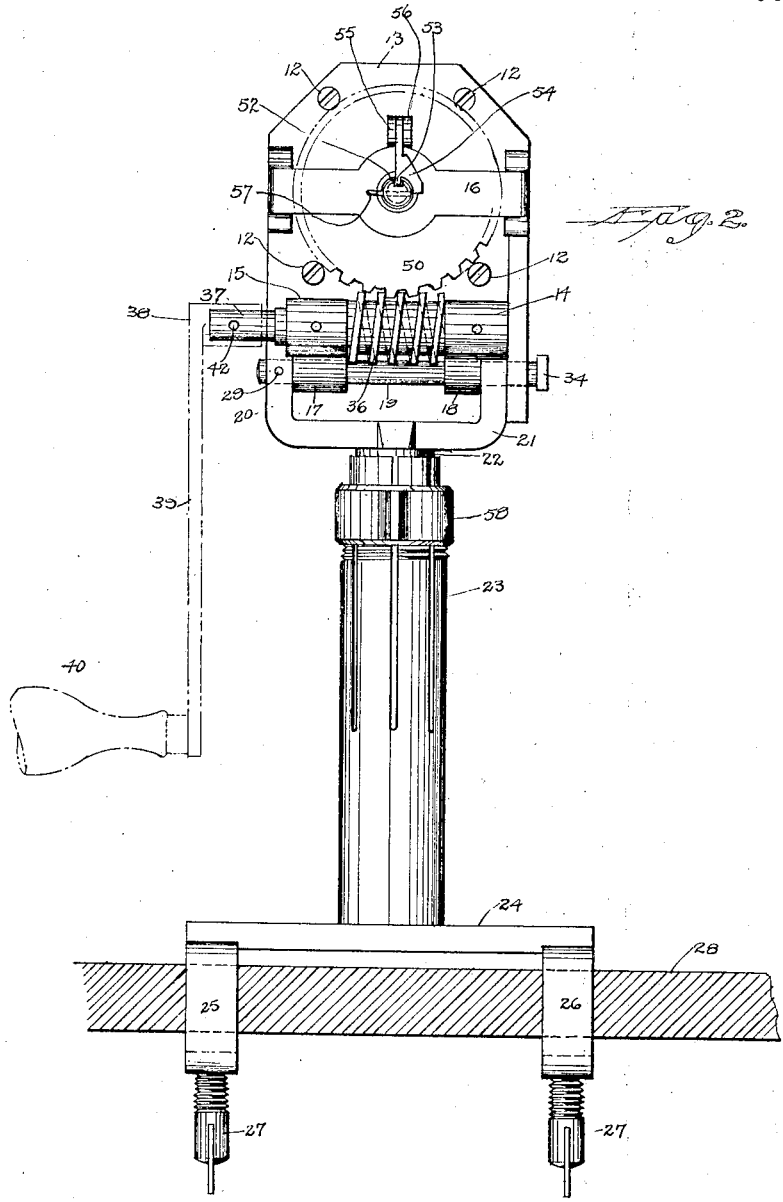

J. CARLSON AND P. PASCUCCI.
MACHINE FOR MAKING MACARONI.
APPLICATION FILED MAY 13, 1919.
1,331,183.
Patented Feb. 17, 1920.
3 SHEETS—SHEET 3.
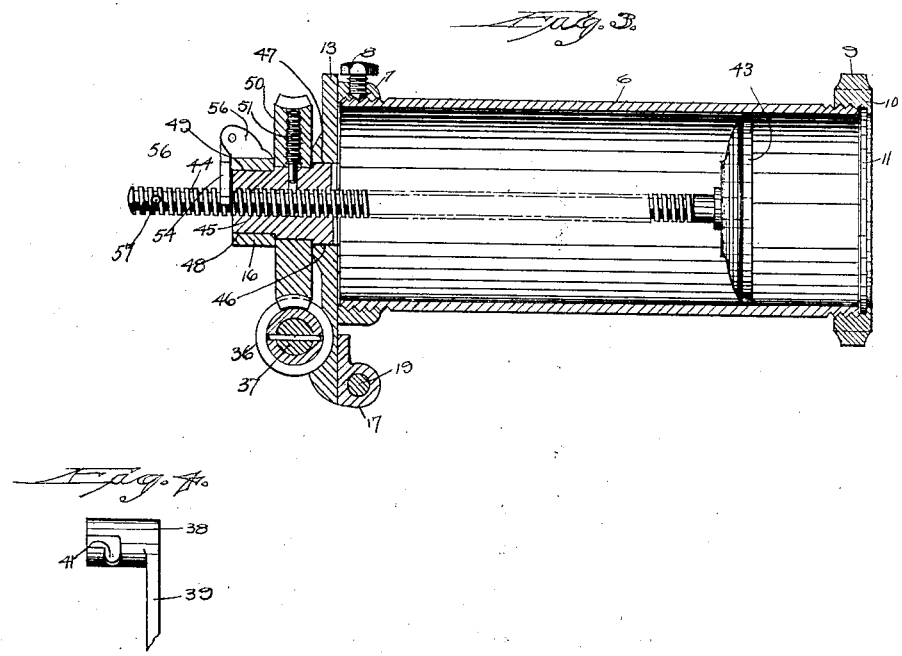

UNITED STATES PATENT OFFICE.

JULIUS CARLSON AND PIETRO PASCUCCI, OF MERIDEN, CONNECTICUT.

MACHINE FOR MAKING MACARONI.

1,331,183.   Specification of Letters Patent.   Patented Feb. 17, 1920.

Application filed May 13, 1919. Serial No. 296,860.

*To all whom it may concern:*

Be it known that we, JULIUS CARLSON, a citizen of the United States, and PIETRO PASCUCCI, a subject of the King of Italy, residing at Meriden, in the county of New Haven and State of Connecticut, have invented a new and useful Improvement in Machines for Making Macaroni; and we do hereby declare the following, when taken in connection with the accompanying drawings and the characters of reference marked thereon, to be a full, clear, and exact description of the same, and which said drawings constitute part of this application, and represent, in—

Figure 1 is a side view of a machine for making macaroni constructed in accordance with our invention.

Fig. 2 a rear end view of the same.

Fig. 3 a longitudinal sectional view through the cylinder and operating means.

Fig. 4 a broken view of the socket portion of the operating handle, detached.

This invention relates to an improvement in machines for making macaroni, and particularly to machines of the type in which dough or paste is extruded through a die plate having openings therein corresponding to the form which the strips are to assume.

The object of this invention is the construction of a machine simple in arrangement and operation, and by which a comparatively large amount of paste may be extruded with a comparatively little effort; and the invention consists in the construction hereinafter described and particularly recited in the claims.

In carrying out our invention we employ a cylinder 6 threaded into a head 7 in which it may be fixed by a set screw 8. The outer end of the cylinder is externally threaded to receive a collar 9 having a flange 10 by which a die plate 11 may be firmly attached to the outer end of the cylinder. These die plates are of construction commonly employed in macaroni machines of this character and may be formed with openings according to the form which the extruded paste is to assume. The head 7 is attached by screws 12 to a back plate 13 formed on its rear face with trunnion bearings 14 and 15 and with a rearwardly projecting yoke 16 the purpose of which will hereinafter appear. Secured to the inner face of the plate are knuckles 17 and 18 through which a pintle 19 extends, the pintle being mounted in the upper ends of arms 20 and 21 formed at the top of the post 22 which is adapted to enter a split tubular bearing 23 arranged upon a base 24, which, as herein shown, is provided with two clamping arms 25 and 26 each mounting a set screw 27 by which the device may be clamped to the top of a table 28. The advantage of having a double clamping member is that it permits the device to be mounted at the corner of a table thus securing a firm support for the device. On the tubular sleeve 23 is a clamping nut 58 by which the post 22 is firmly connected within the sleeve 23. One end of the pintle is fixed to the yoke by a pin 29, while the other end is formed with a head 30, located in a recess formed in the outer face of an inwardly projecting wall 31, the outer face of this wall being formed with notches 32 and 33 to receive the end of a latch 34 which is pivotally mounted in a notch in the end of the pintle and formed with a finger-piece 35 by which the latch may be moved out of engagement with either one of the said notches. Between the trunnions is a worm gear 36 on a shaft 37 which projects to one side of the plate 13 to receive a socket 38 on the handle arm 39 which is provided with a crank handle 40. As herein shown, the socket 38 is formed with a bayonet slot 41 to engage with a pin 42 in the projecting end of the shaft 37. Within the cylinder is a plunger 43 swiveled on the end of a feed screw 44 which extends through a nut 45 having a bearing surface 46 closely fitting a hole 47 formed for it in the plate 13 in line with the center of the cylinder. The said nut also has a bearing 48 at its outer end having a seat in a hole 49 formed for it in the yoke 16 and mounted on this nut between the rear face of the plate and the yoke is a worm gear 50 fixed to the nut by a screw pin 51, this worm gear meshing with the worm 36. The feed screw 44 is formed with a longitudinal groove 52 to receive the nose 53 of a dog 54 which is pivotally mounted between lugs 55 and 56 projecting upward from the top of the yoke by which the feed screw is locked against rotation with respect to the casing. In the end of the screw 44 which corresponds in diameter to the diameter of the end of the pintle 37 is a pin 57 by which the crank handle may be connected with the worm screw.

Preparatory to charging the machine, the plunger 43 is retired, and this may be rapidly done by applying the handle to the end of the feed screw and lifting the locking dog out of engagement with the groove 52 in the screw so that the screw may be turned in the nut 45. When the plunger is sufficiently retired dough or paste is inserted into the cylinder in front of the piston and the die plate secured in place. The feed screw is then turned so as to crowd the plunger against the material in the cylinder and move it against the plate, but before the paste is extruded the handle is removed from the the feed screw, the latch 54 turned down so as to hold the feed screw against rotation and the handle is applied to the end of the pintle 37 so that by turning the handle the worm 14 is turned and this meshing with the worm gear 50 turns the nut 45, and hence gradually advances the feed screw and the plunger. The increased leverage thus obtained by applying the power through the worm and worm gear enables one to force the material through the die plate with the expenditure of but little energy. The cylinder may be locked in a horizontal position or tilted downward by tripping the latch so as to permit the plate carrying the cylinder to be turned on the pintle 37.

We claim:—

1. A machine for making macaroni comprising a casing, a plate with which said casing is connected, a yoke mounted on the rear face of said plate, a nut having a bearing in said yoke and plate, a feed screw extending through said nut, a worm gear connected with said nut, a worm meshing with said worm gear, and means for fixing the feed screw against rotation with respect to the casing.

2. A machine for making macaroni comprising a casing, a plate with which said casing is connected, a yoke mounted on the rear face of said plate, a nut having a bearing in said yoke and plate, a feed screw extending through said nut, a worm gear connected with said nut, a worm meshing with said worm gear, said feed screw formed with a longitudinal groove, and a dog adapted to be turned into said groove whereby the screw is held against rotation in the nut with respect to the casing.

3. In a machine for making macaroni, the combination with a cylinder, means for connecting the cylinder with the head, said head pivotally connected with a vertical support, a plunger in said cylinder, a feed screw with which the plunger is swivelly connected, a yoke mounted on the rear face of said head, a nut on said feed screw, and supported in said yoke, and means for locking the screw against rotation in the nut with respect to the casing, a worm gear connected with said nut, a worm meshing with said gear, and a handle adapted to be applied to the feed screw or to the worm.

In testimony whereof, we have signed this specification in the presence of two subscribing witnesses.

JULIUS CARLSON.
PIETRO PASCUCCI.

Witnesses:
ALFRED B. AUBREY,
ERNST LIPPERT.